United States Patent [19]
Weiss

[11] 3,758,196
[45] Sept. 11, 1973

[54] OPTICAL MAGNIFYING SYSTEM AND APPARATUS FOR VIEWING SMALL OBJECTS

[76] Inventor: Helmut Weiss, 1230 Berkshire Ln., Newport Beach, Calif. 92660

[22] Filed: Apr. 12, 1971

[21] Appl. No.: 133,191

[52] U.S. Cl................... 350/241, 350/286, 350/296
[51] Int. Cl. ............................................ G02b 17/00
[58] Field of Search.................... 350/145, 199, 286, 350/287, 296, 241

[56] References Cited
UNITED STATES PATENTS

| | | | |
|---|---|---|---|
| 2,883,908 | 4/1959 | Copeland | 350/145 |
| 3,357,769 | 12/1967 | Thompson | 350/199 |
| 3,432,219 | 3/1969 | Shenker | 350/199 |
| 3,536,380 | 10/1970 | Ferguson | 350/199 |
| 3,524,380 | 8/1970 | Yamada | 350/286 |

Primary Examiner—Ronald L. Wibert
Assistant Examiner—Michael J. Tokar
Attorney—Miketta, Glenny, Poms, Smith & Browne, Beveridge, De Grandi & Kline

[57] ABSTRACT

A compact, portable, readily handled magnifying system and apparatus including an optical system employing a concave mirror surface reflecting light from a subject or objective means located adjacent one edge of the mirror surface and reflected to the mirror surface by a light transmitting and reflecting surface which permits passage of the reflected light from the concave mirror surface to a viewing zone, the optical elements being arranged to provide high magnification and a wide viewing zone or span of substantial length along the viewing axis whereby eye fatigue is reduced and minimized. A compact, readily manually handled apparatus for presenting small subjects to be viewed, such as microfilm frames, to such an optical magnifying system by advancing the subjects to be viewed along a helical path.

22 Claims, 18 Drawing Figures

INVENTOR

INVENTOR

OPTICAL MAGNIFYING SYSTEM AND APPARATUS FOR VIEWING SMALL OBJECTS

BACKGROUND OF THE INVENTION

The collection, processing, handling and storage of large quantities or amounts of information of many types and sources in Government and in industry has emphasized and brought to a critical stage the availability and storage of such information and data by usual file cabinets and storage facilities. The storage space required for the filing and keeping of all such information and data being produced by numerous source agencies has become so great that various systems have been proposed to alleviate this problem. One prior proposed system includes the transfer and reduction in size and media of such data and information to photographic film of various types and sizes and commonly referred to as microfilm wherein an entire page may be recorded on a film frame of quite small area. Transfer of such data and information to microfilm necessitates a system for rapid convenient retrieval and reading of such information at some future time.

Prior proposed systems for reproducing an image made on a microfilm have generally included projection readers and direct view lens readers. Projection readers provide a magnified real image of the data on the microfilm projected upon a suitable screen where the magnified images may be readily directly viewed and read. Such projection reader equipment is relatively expensive, bulky, occupies substantial space, and requires precision lens and precision assembly. While such projection readers require high power illumination and heat dissipating means, such readers can only be used in relatively low ambient illumination.

Prior proposed direct view lens readers include a magnifying lens assembly through which the object is viewed directly by one eye of the user. Such lens readers are relatively small, inexpensive, portable, substantially efficient in light utilization, and free from interference from ambient illumination. However, such prior proposed lens readers were limited in lens magnification and wide angle of view in order to provide a satisfactory, undistorted image suitable for microfilm viewing. In addition, the user was required to bring one eye close to the lens of the lens reader to see the maximum field of view, and when such close position was maintained for a substantial length of time the user's eye became very tired and fatigued. The available range of change in the position of the eye with respect to the lens in such lens readers was a measure of a condition referred to as eye relief. Thus closely restricted and little movement of the eye in relation to the lens in order to view a satisfactory image for a sustained reading period would be referred to as a condition of poor eye relief. As a result of such poor eye relief condition in prior lens readers, such prior lens readers were poorly accepted on the market and were useful only for short reading intervals such as "look up" as compared to long reading intervals, such as "sustained" reading.

The present invention contemplates a novel optical concept in a lens reader wherein the screenless, direct view, virtual image advantages of prior proposed lens readers are augmented by a highly improved wide angle image and eye relief conditions. The invention also contemplates use of the novel optical concept in the construction in real image projection readers wherein a real image may be only partially magnified by the projection system and further magnified by the optical system of the present invention. Such compound readers would be adapted to handle high magnifications and would alleviate many disadvantages of conventional real image projection readers. Moreover, the novel optical system of the present invention has general usefulness and applicability as a wide angle, high power lens system which may be used either singly or as an eye piece in compound optical instruments in applications other than microfilm reading.

It is therefore a primary object of the present invention to provide a compact solid optical system in which a very small image is magnified to a size adequate for comfortable viewing and in which the eye viewing space or span for such image is increased to a maximum so that eye fatigue from lack of viewing space is substantially minimized.

An object of the present invention is to disclose and provide a compact optical system wherein a curved mirror surface reflects a virtual image and transmits such image through a light transmitting and reflecting surface into a large or elongated viewing span.

Another object of the present invention is to disclose and provide a compact optical system for magnifying microfilm images in which the system includes a body of clear refractive material providing optical surfaces which include a concave mirror surface and a semi-transparent light transmitting and reflecting surface.

Another object of the present invention is to disclose a compact optical system wherein one edge of a light transmitting and reflecting surface is proximate to and at an angle to a concave mirror surface and wherein the optical axis from a subject is folded relative to the surface of the light transmitting and reflecting surface in such a manner as to provide for maximum viewing space whether the subject is relatively small or relatively large.

A further object of the present invention is to disclose and provide a compact magnification optical system readily adapted for use in viewing opaque objects, transparent objects, displays generated by miniature cathode ray tubes, and adapted for use with binocular or monocular viewers, microscopes or telescopes, and as an eye piece for various types optical instruments.

A still further object of the invention is to disclose a novel direct view, screenless, virtual image lens-type reader providing improved wide angle, magnified, well defined images capable of being viewed for sustained reading and yet inexpensive to manufacture and sell so that readers embodying this invention will be readily available to end users, such as students.

The present invention particularly contemplates a compact optical system which includes a clear refractive solid material so arranged in a viewing device that a microfilm or microfiche may be transported intermittently in the plane of the objective in novel manner so as to readily view and read information printed on the microfilm without eye fatigue.

Various other objects, advantages, and exemplary optical arrangements and uses of the present invention will be readily apparent from the following description of the drawings in which several exemplary embodiments of the present invention are shown.

IN THE DRAWINGS

FIGS. 5 through 9 inclusive schematically illustrate modifications of the optical system shown in FIGS. 1 and 2.

Figures 1, 1A, 2, 3, 9:
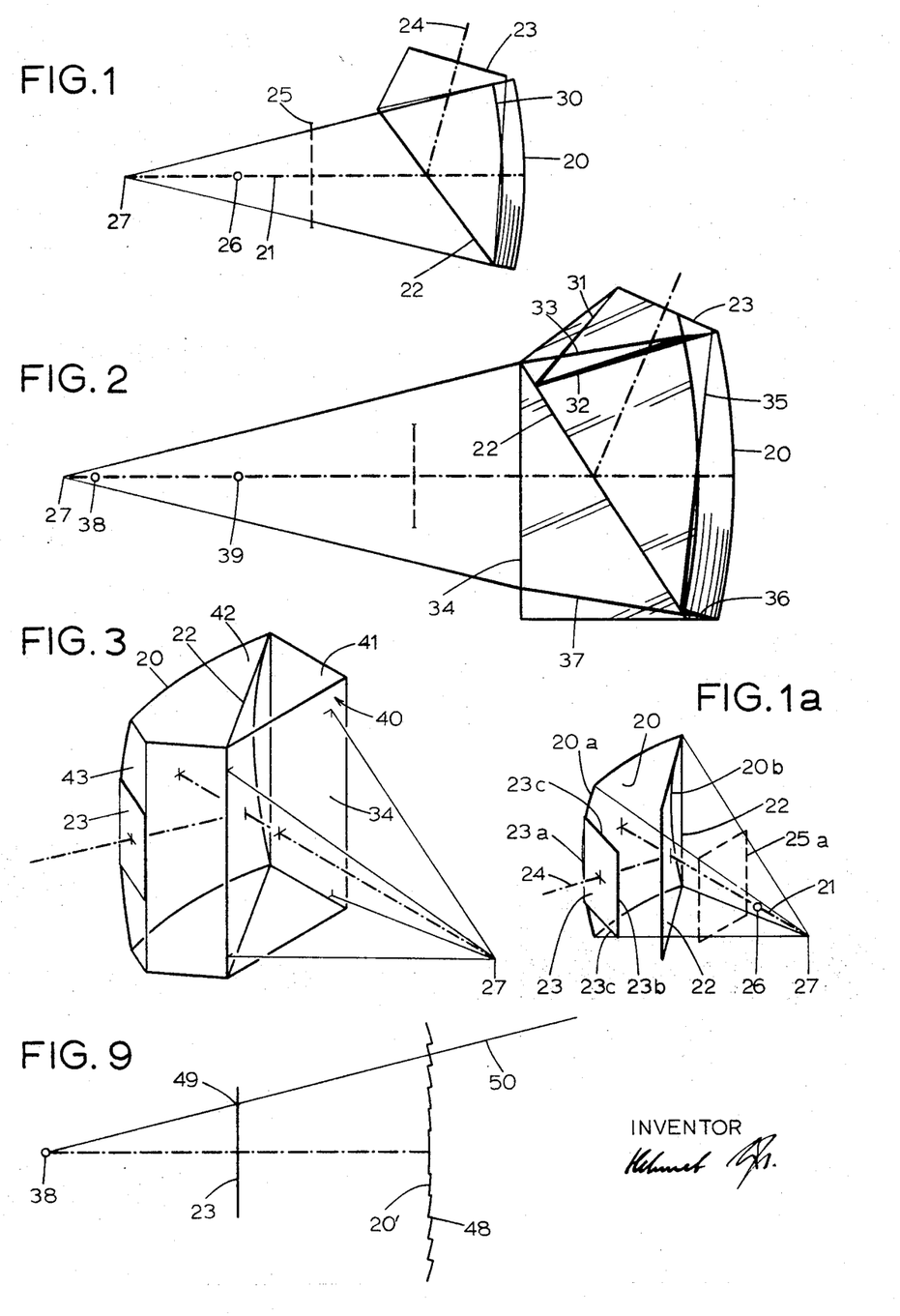
FIG. 1 is a plan view of an optical system embodying this invention.
FIG. 1a is a schematic perspective view of the optical system in plan in FIG. 1.
FIG. 2 is a plan view of the optical system shown in FIG. 1 in which the optical system is provided in a body of refractive material, the scales of FIGS. 1 and 2 being the same optically.
FIG. 3 is a perspective view of the solid body of refractive material shown in FIG. 2.
FIG. 9 illustrating schematically a modification of the surface of the concave mirror to provide a plane image of a plane object.

The above-described drawings illustrate an optical system embodying this invention and in which FIGS. 1-3, inclusive, show the basic optical system, FIGS. 4-13 show modifications and exemplary adaptations of the optical system, and FIGS. 14-17 show exemplary devices embodying the optical system and used for viewing a microfilm or microfiche.

In FIG. 1 the optical system is schematically illustrated and includes a concave mirror surface 20 for the purpose of illustration assumed to be of spherical form, surface 20 having an optical and viewing axis 21. Extending diagonally across optical axis 21 from one edge of mirror surface 20 is a light transmitting and reflecting surface 22 serving as a semitransparent mirror. Adjacent edges of the surface 22 and surface 20 are closely proximate or touching. The plane of the surface 22 forms with the chord of the concave surface 20 an acute angle. At the opposite side of concave surface 20 is positioned in proximate or closely touching relationship one edge of an object or subject 23 to be viewed and magnified. Subject 23 is, for example, a frame of a microfilm or microfiche. In FIG. 1 subject 23 is positioned in a plane which forms an obtuse angle with the plane of the chord of surface 20. Semitransparent surface 22 views subject 23 along optical axis 24. Thus, in general, semitransparent surface 22 reflects rays from the subject 23 as if the rays were emanating from a virtual image 25 which is oriented perpendicular to the optical axis 21 and located inside the focal length near the focus of the concave mirror surface 20. This intermediate virtual image 25 is then magnified by the concave mirror surface 20 and the final virtual image is viewed along optical axis 21 through the semitransparent surface 22.

In FIG. 1a the optical system described above is shown in perspective to better illustrate the proximate and touching relation of edge 23a of the subject 23 with the edge 20a. The proximate close touching relation of edge 22a of the semitransparent surface 22 is shown with respect to the edge 20b of the concave mirror surface 20. The virtual image 25 is shown along the viewing axis 21. In this perspective view the horizontally disposed folding plane defined by the axes 24 and 21 is readily apparent. The subject 23 is symmetrically disposed with respect to axis 24 and in this example the rectangular frame of the subject may have a height to width ratio of 1:5.

It is important to note that maximum apertures are utilized in the optical transmission of the subject 23 so that maximum magnification and viewing space is provided. The rectangular periphery of subject 23 together with the point such as 26 from which the magnified image is viewed determines the marginal rays which define the apertures utilized on the optical surfaces 22 and 20. It should be noted that the semitransparent surface 22 interacts with marginal rays twice and the aperture utilized on the semitransparent surface 22 is defined by either the reflected rays or by the transmitted rays whichever happen to circumscribe the largest area. For a magnified image to be fully visible from viewing point 26 none of the optical surfaces, that is semitransparent mirror 22 and concave mirror surface 20, must cut into an aperture utilized on another surface. Since utilized apertures on these surfaces tend to become larger when the distance between the magnifier and the viewpoint 26 becomes greater, this requirement of noninterference of apertures has the effect of restricting the available viewing space or the locations along optical axis 21 from which the magnified image can be viewed.

In the optical system described above it will thus be apparent that by arranging the surfaces 22 and 20 and the subject 23 so that maximum apertures may be utilized the restriction on viewing space on the viewing axis 21 is relieved as far as possible. Maximum apertures are achieved when each optical surface just touches the apertures utilized on adjacent surfaces. Thus, it will be apparent that the arrangement of edge 22a being proximate to and touching edge 20b of the concave mirror and the touching of edge 23a with the edge 20a of the concave mirror provides a maximum or the widest possible magnifying aperture while allowing the viewing point to be moved to a maximum distance from the magnifier, as indicated by the point 27.

This arrangement of maximum aperture and viewing space is further described in detail by tracing marginal rays from the subject 23 through the optical system to the outermost view point 27. Marginal rays originating at the sides 23a and 23b of the subject 23 define the horizontal aperture of the concave surface 20 and marginal rays from the top and bottom edges 23c of the subject define the vertical aperture, the upper and lower edges of which appear as the arc 30. The marginal rays from each of the two sides 23a and 23b of the object occupy a substantially vertical but slightly curved fan-shaped surface hose projection into the folding plane defined by the axes 21 and 24 may be traced by a line of varying width. Thus the marginal rays from the side 23a are described as indicated in FIG. 2 by the widening line 35 from the object to the reflective surface 22, by the further widening line 36 from the surface 22 to the concave mirror surface 20, by the narrowing line 37 from the surface 20 to an exit plane 34, and by a further narrowing line whose width vanishes at the point 27. Similarly the marginal rays from the side 23b are described by the widening line 31 from the object to the reflective surface 22, by the further widening line 32 from the surface 22 to the concave mirror surface 20, by the narrowing line 33 from the surface 20 to the exit plane 34, and by a further narrowing line whose width vanishes at the point 27. Thus, it will be apparent that locating in close touching relation the adjacent portions of the edges of the subject 23, concave mirror surface 20, and light transmitting and reflecting surface 22 will provide utilization of maximum apertures of the optical surfaces provided.

Exit plane 34 touches the aperture of the semitransparent surface 22 which, in the case illustrated in FIG. 2, is determined by the marginal rays 33. Such exit plane 34 provides a base for a pyramid having an apex at 27, the pyramid thus formed defining the viewing space provided by the optical system, or locations at which the eye may be placed for viewing the reflected image of subject 23.

The optical surfaces forming the optical system described above may be provided in various ways. A preferred method of providing such optical surfaces in a compact precise arrangement is illustrated in FIGS. 2 and 3 wherein a solid body 40 of clear transparent material such as glass or suitable plastic materials, such as acrylic compositions, is shown. Surfaces on such a solid body 40 may be precisely configured and may then be coated with suitable reflective coatings. Thus body 40 includes surface 20 of concave or spherical form, a surface at 22 formed by an interface between two parts 41 and 42 forming body 40, the surface 22 being coated and the parts 41 and 42 being bonded together for optical contact in well known manner. In addition, body 40 includes a surface 43 at which the subject 23 may be located and also a surface 34 which provides the exit plane or surface which intersects the semitransparent surface 22 as described above. The other surfaces of the clear transparent magnifier body 40 do not participate in formation of the magnified image and may be of arbitrary shape and form as long as such optically inactive surfaces do not interfere with or disturb the passage of the marginal rays. In FIG. 2 viewing space is again that space between exit plane 34 and apex 27 of the pyramid which has its base at the exit plane 34.

It will be apparent that although the magnifying optical system of FIG. 2 is designed for the same object size and magnification as the optical system of FIG. 1, the magnifying system in FIG. 2 affords substantially more viewing space (the two figures being drawn to the same optical scale for such comparison purposes). The effect of utilizing a refractive body to provide the active optical surfaces increases the linear dimensions of the available viewing space by a factor exceeding the refractive index $n$, assuming $n$ equals 1.5 for the purpose of this illustration. The optical magnifying system in FIG. 2 may be compared with an ideal thin lens with a positive power equal to n times that of the concave mirror and a diameter equal to the diagonal of the aperture utilized on exit surface 34. To match the viewing space of the optical magnifying system of FIG. 2 a thin lens would need a relative aperture of 1/0.53 which is close to the theoretical limit of 1/0.5. It should be realized that an actual lens becomes relatively thicker with increasing relative aperture with the result that its viewing space is shorter than that of a thin lens having the same relative aperture. Thus, with regard to viewing space, the advantage of filling the reflective magnifier with a refractive material becomes apparent.

While FIGS. 1—3, inclusive, illustrate the novel optical system of this invention and provide greatly enlarged viewing space, it is necessary to consider the quality of the image viewed by the eye. Generally speaking, the optical system described above is substantially free from aberrations affecting the sharpness of the magnified image, however, there may be distortions in the form of field curvature which may require correction.

Figure 4:
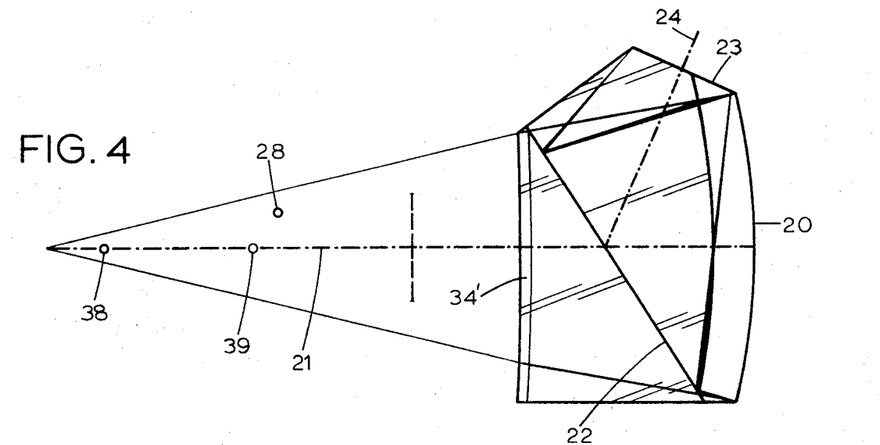
FIG. 4 is a plan view similar to FIG. 2, the exit surface on the body of refractive material being modified to illustrate a different embodiment of the invention.

In FIG. 4 the magnifying optical system of FIG. 2 with a refractive material providing the surfaces is shown. FIG. 4, however, incorporates a concave exit surface 34' in place of the planar exit surface 34 of FIG. 2. The concave exit surface 34' of selected curvature improves the tolerance of the magnifying system to off-axis viewing in that it reduces astigmatism. To visualize this effect it is assumed that the center of the magnified virtual image is viewed from a point such as 28, removed from the axis 21, so that the line of sight meets the concave mirror surface at oblique incidence. As oblique incidence at a concave mirror surface of spherical shape causes astigmatism of negative sign, whereas oblique incidence at the transition from a refractive medium to air causes astigmatism of positive sign, astigmatism caused by the surface 20 can be compensated by oblique indicence at the exit surface. As the line of sight is parallel to axis 21, refraction at a plane exit surface would be orthogonal and therefore free from astigmatism. However, curvature of the exit surface 34' provides the necessary tilt to generate astigmatism and its concavity increases the amount of astigmatism over that available of an equally tilted plane surface. Although these beneficial effects are partially offset by higher negative astigmatism from the concave mirror surface 20 whose curvature must be increased to balance the demagnifying effect of the concave exit surface 34', it will be understood that selected curvature for surface 34' will improve tolerance of the optical system to off-axis viewing.

It will also be understood that negative astigmatism caused by the concave mirror surface 20 may be reduced by making the surface aspherical so that its meridional curvature decreases slightly with increasing distance from axis 21. Depending upon the application to which the optical system is adapted an aspheric surface 20 and a concave exit surface 34' may be used singly or in combination. Combined astigmatism from entrance surface 43, mirror surface 20 and exit surface 34, 34' limits what may be called stigmatic viewing space. Such stigmatic viewing space includes all points of view from which no part of the magnified image suffers more than a specified amount of tolerable astigmatism and may be illustrated as having the general shape of a double pyramid with apexes on the axis 21 and base near the point 39 where the exit surface 34, 34' images the paraxial curvature center 38 of the mirror surface 20. Thus stigmatic viewing space may be located at a preferred position along the viewing axis 21 or the space or volume in which astigmatism is tolerable may be maximized. While the method of astigmatism control is described above, it will be understood by those skilled in the art that the basic optical system shown in FIG. 2 will be adequate for many applications for direct reading of very small subjects.

FIGS. 5-9, inclusive, illustrate, in schematic, means for controlling image curvature as by bending the virtual image seen by the mirror surface 20 or by modifying the mirror surface 20 so that a plane image of a plane object may be formed. Image curvature may be acceptably accommodated by a reader's eye for short periods of time. However, prolonged reading which requires a continual change of accommodation of such image curvature will cause eye fatigue. In an ideal situation a reader's eyeball should be centered at point 39 on optical axis 21, point 39 being the virtual image formed by the exit surface 34 of the center of curvature 38 of mirror surface 20. In such case the line of sight through the center of the eye pupil undergoes essentially normal reflection at mirror surface 20 regardless of eyeball rotation. The magnified image is practically free of aberrations including lateral distortion and the pattern of the image appears undistorted. The surface of the image, however, may still be grossly distorted in longitudinal direction. Unless the virtual image of the object 23, as seen by the concave surface 20 after transmission through the entrance surface 43 and reflection at the semitransparent surface 22, has a curvature concentric with that of the mirror surface 20, distance from the eye center 39 to the magnified image will vary across the field of view.

Figure 5:
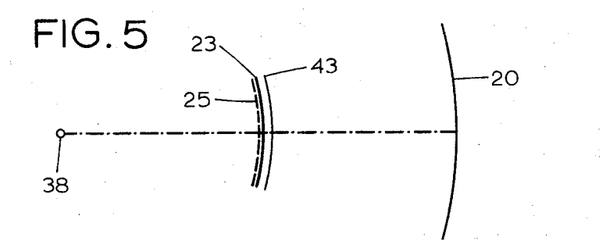
FIG. 5 schematically illustrating concave curvature of the surface of the object and the entrance surface of the magnifier body to accommodate field curvature of the concave mirror.
Figure 6:
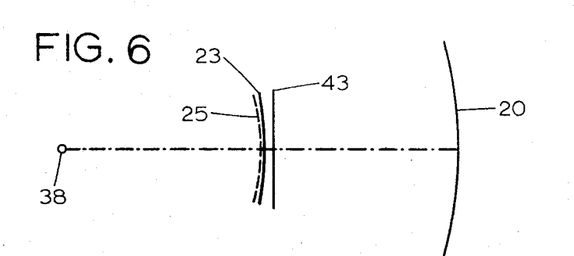
FIG. 6 showing schematically the entrance surface of the magnifier body being planar.
Figure 7:
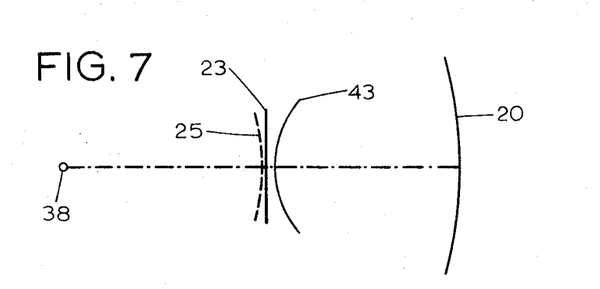
FIG. 7 schematically showing curvature of the entrance surface of the magnifier body being convex and the subject surface planar.

An exemplary means of controlling the image curvature is shown in FIGS. 5-7, inclusive, the optical system involving the reflecting mirror surface 20 and the entrance surface 43 being unfolded, that is, without illustration of the semitransparent surface 22. The concave surface 20 and the virtual image 25 are both assumed spherical and centered at point 38. Consequently the surface of the magnified image also is spherical and centered at point 38, and eye accommodation required for viewing the magnified image remains fixed throughout the field of view. In FIG. 5 all surfaces are concentric, that is, the mirror surface 20, the entrance surface 43, the subject surface 23 and the virtual image 25. In FIG. 6 the entrance surface 43 is made planar and the object surface 23 is bent to less curvature than in FIG. 5. As refraction at the entrance surface magnifies the gap between the surface and object by the refractive index, it magnifies object curvature by the same factor. FIG. 7 shows the subject surface 23 planar and the entrance surface 43 convex.

Figure 8:
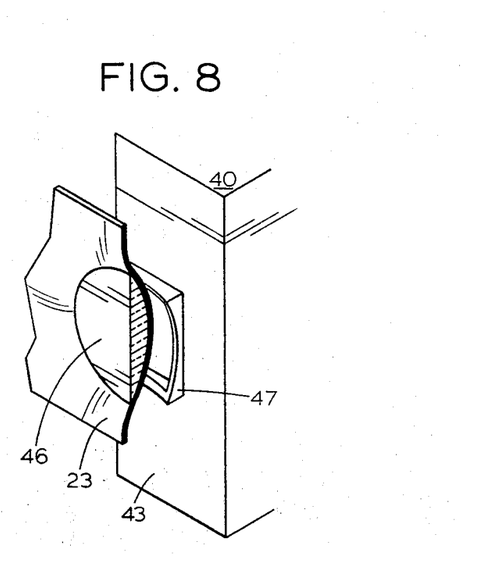
FIG. 8 being a perspective view partly in section showing an arrangement for imparting selected curvature to the surface of the object.

It should be noted that in the examples shown in FIGS. 5, 6, and 7 the bending of certain surfaces therein alleviates the need for bending the object but may have undesirable effects on image quality. As oblique incidence at the transition from air to a refractive medium causes negative astigmatism whose amount increases with increasing obliquity and in proportion to the width of the gap between the object 23 and the entrance surface 43, loss of image quality can be understood to affect the peripheral portions of the image. Thus under some conditions it may be desirable to physically bend the film at the object surface at 23. FIG. 8 illustrates an exemplary way of deforming or bending a film at the object 23. In this example, the flexible film providing the object 23 is temporarily deformed by pressing the film against a convex surface of a transparent lens 46 partially received within a surrounding hollow ring 47. In the event entrance surface 43 is spherically concave as indicated in FIG. 5, the film could be pressed directly against the hollowed entrance surface. Pneumatic pressure or other suitable pressure differential means of course may be employed to suitably bend the film.

In FIG. 9 the other or second method of controlling image curvature is illustrated with the optical system unfolded as above and with the object surface 23 facing the mirror surface 20'. Mirror surface 20' is made physically flat but optically concave by providing coaxial annular zones of concentric surface curvature, these zones being stepped as indicated at 48. Viewed from the curvature center 38 the image of object 23 appears circularly corrugated but otherwise plane and free from distortion. The image of a given object point 49 is formed at the intersection of the image plane with the curvature radius 50 through the object point. It will be understood that curvature control may be required for certain applications while in other applications it may not be.

Figures 10, 11, 12:
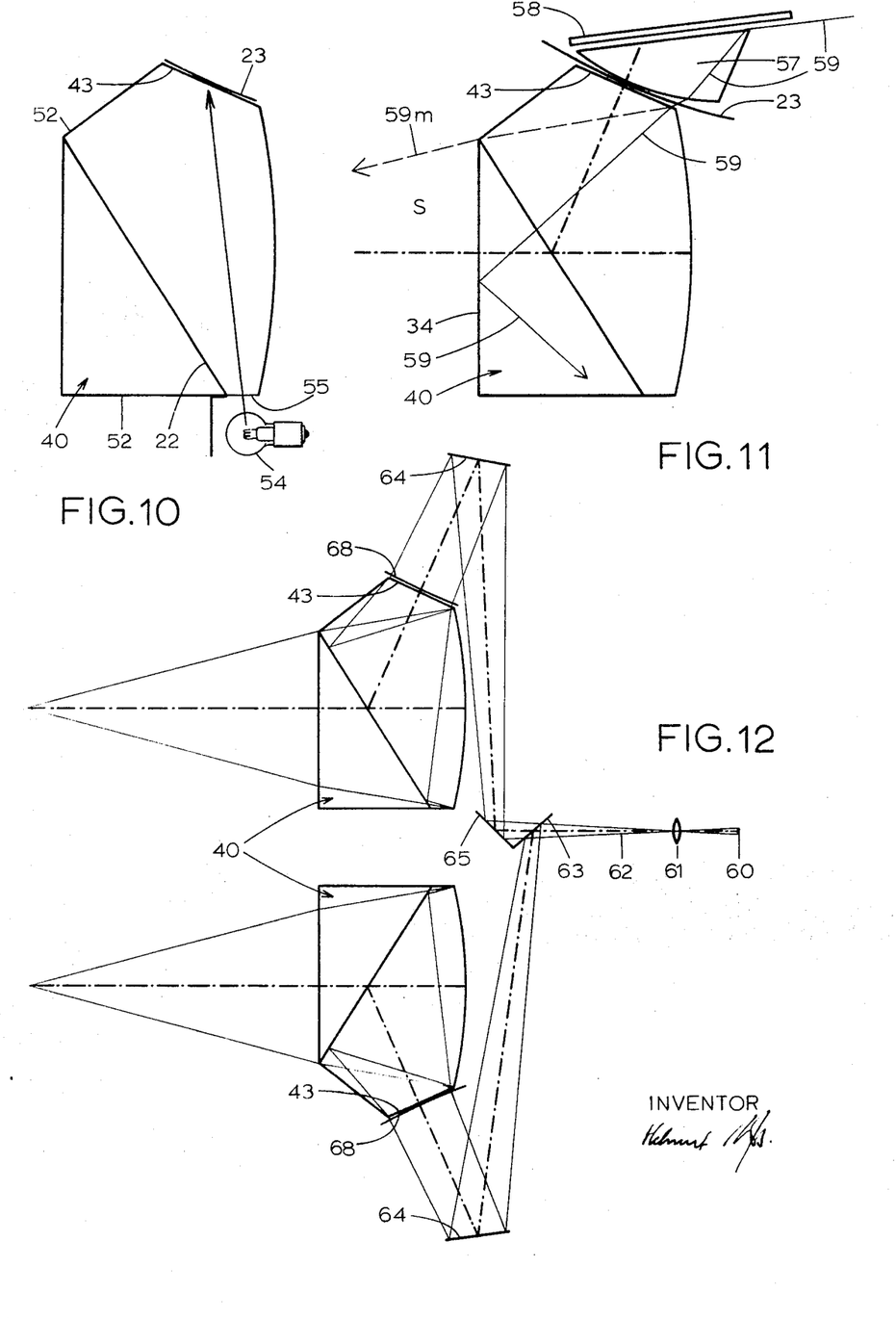
FIG. 10 is a schematic view of the magnifier body of FIG. 2 illustrating a modification thereof to provide illumination of an opaque object.
FIG. 11 is a schematic view of the magnifier body shown in FIG. 2 modified to illuminate a transparent object.
FIG. 12 is a schematic view of the optical system of FIG. 2 utilized in a binocular eye piece for a microscope.

Various applications and modifications are of the basic optical system described above are illustrated in FIGS. 10, 11, 12 and 13. In FIG. 10 the basic optical system incorporated in a body of clear refractive material as described above for FIGS. 2 and 3 is shown and similar surfaces are given like reference numerals. In FIG. 10 body 40 includes optically inoperative surfaces which may be ground to a matte finish and coated or painted with a light absorbing material such as black paint or black rubber. These black coated surfaces are generally indicated at 52. Entrance surface 43 is uncoated beneath an object 23. In this example, object 23 is opaque and its surface is illuminated by a light source 54 which passes a light beam through an opening 55 at the intersection of concave mirror surface 20 and semitransparent surface 22. Space for such opening is apparent from FIG. 3.

FIG. 11 shows an exemplary method of illuminating a transparent object 23 whose surface at the entrance surface 43 is convexly curved by a surface of a prism 57 having a light diffusing means 58 through which light reaches the transparency 23. It should be noted that interposing the prism between the light diffuser and the object 23 provides a system where total reflection of the illuminating light occurs at the exit surface 34 as indicated by ray 59 so that the illuminating light is prevented from leaving the body 40. Without the prism 57 the object 23 would be visible from the space S between the marginal ray 59m and the exit surface 34.

FIG. 12 illustrates use of the basic optical system shown in FIG. 2 in a binocular eyepiece of a microscope. An illuminated subject 60 may be magnified by an objective lens 61 and the image forming beam 62 is divided by a semitransparent mirror 63 which reflects light from beam 62 to a mirror 64 which reflects light to the entrance surface 43 of a magnifier body 40. Light transmitted through semitransparent mirror 63 may be reflected from mirror 65 to a mirror 66 and thence to entrance surface 43 of a second magnifier body 40. The optical paths from the subject 60 to the entrance surfaces 43 of the magnifier bodies 40 are adjusted in length so that both real images are focused near the entrance surfaces 43 where such real images take the place of the object 23. To maintain the inherent viewing space of the magnifier bodies the real images are intercepted by translucent diffusing screens 68 which may be curved for the purpose of controlling curvature of the magnified virtual image as previously described with respect to FIGS. 5 and 6.

In the event a monocular microscope is desired objective lens 61 could be combined with a single magnifier body 40. It will be further understood that the magnifier body 40 embodying the basic optical system may be used in other applications than a microscope eyepiece andmay serve as an eyepiece in any optical instrument capable of forming a real image of adequate brightness.

Figures 13, 14:
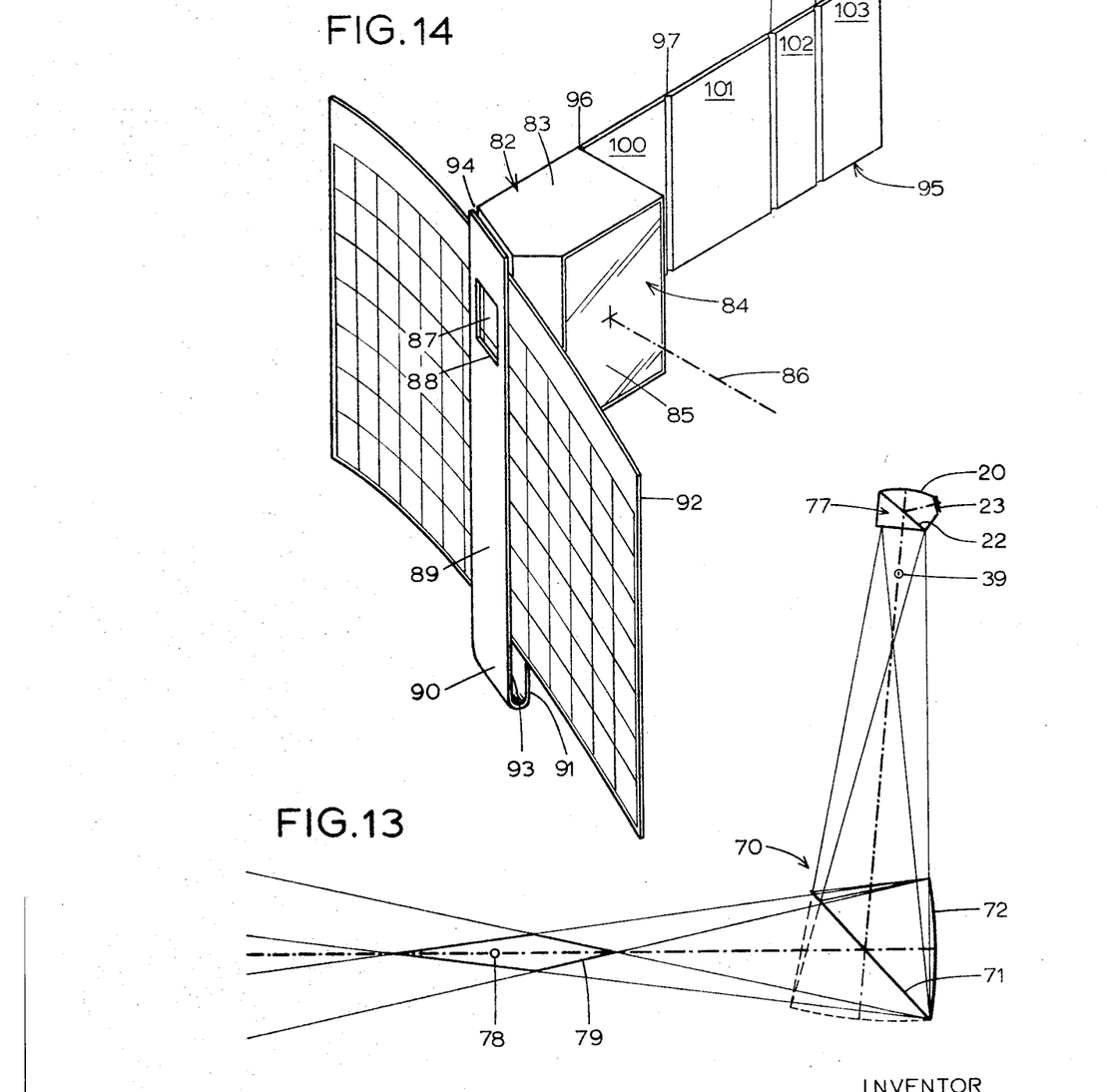
FIG. 13 is a schematic view showing the optical system of FIG. 2 utilized with a relay system to further increase eye relief.
FIG. 14 is a perspective view of a device embodying the optical system of FIG. 2 for viewing a microfiche card.

FIG. 13 illustrates an optical system embodying the optical system shown in FIG. 2, that is the system embodied in a block of refractive material, and an enlarged version of the basic optical system shown in FIG. 1, the two component systems being combined for the purpose of increasing eye relief.

The component system generally indicated at 70 includes a semitransparent light transmitting and reflecting surface 71 and a concave mirror surface 72. The component system 70 acts as a relay forming in the vicinity of the user's eye a real image of the ideal view point 39 of the magnifying component system generally indicated at 77. If the relay is used at unit magnification, so that the ideal view point 39 is imaged at the curvature center 78 of the concave mirror surface 72 as indicated in FIG. 13, it will be apparent that the field angle of the magnifying system is preserved. However the field angle may be widened or narrowed by using the relay system 70 at lower or higher magnification.

The magnifying system 77 is slightly modified from the optical system shown in FIG. 2 in that the virtual image 25 now is located outside the focal length of the concave mirror 20, enabling the concave mirror to form a magnified real image of the object 23 rather than a virtual image. If this intermediate real image is focused on the concave mirror surface 72 as illustrated in FIG. 13 the optical accuracy of the mirror surface 72 is not critical, and parallax is not apparent between the magnified image and the rim of the mirror surface 72. It should be understood however that the intermediate real image may be focused some distance in front of the mirror surface 72 to place the final virtual image anywhere between the surface of mirror 72 and infinity.

In the relay arrangement of FIG. 13 the eye relief obtained is controlled by the size of the concave mirror surface 72 and may be made arbitrarily long. Physical removal of the basic magnifying system 77 from the user's eye doubles the length of the geometric viewing space which may now take the shape of a doubled pyramid as indicated at 79. It will be understood that the relay system shown in FIG. 13 may be employed for binocular viewing by using a pair of the magnifying systems 77.

In FIGS. 14–17 optical systems embodying the invention are shown incorporated in apparatus adapted to be hand held or desk mounted, compact, portable, lightweight, and inexpensive.

In FIG. 14 an exemplary device generally indicated at 82 embodying this invention may comprise a suitable housing 83 enclosing a magnifier body 84 of the type described with respect to FIG. 2. Magnifier body 84 includes an exit surface 85 from which a viewing axis 86 is projected. A subject 87 to be viewed is positioned in a rectangular opening 88 proivded in a vertically disposed U-shaped clip 89 having outer and inner legs 90 and 91 with closely parallel opposed surfaces. Inner leg 91 may be secured in suitable manner to housing 83. Rectangular opening 88 is opposite the entrance surface (corresponding to surface 43 of body 40, FIG. 2) of the magnifier body 84. Ambient light or a light source may illuminate the subject 87 for transmission and imaging of the object through the magnifier body 84 as previously described. The eye of the user is located along the viewing axis 86 as previously described with respect to the systems of FIG. 1 and FIG. 2.

The U-shaped clip 89 may hold a microfilm, microfiche, or other small transparent subject mounted to facilitate viewing. The subject 87 may be carried on a member such as card 92 which may be readily inserted through the vertical slot 93 provided by the U-shaped clip 89, slot 93 having also a top opening 94. Thus the card 92 is readily moved upwardly, downwardly, forwardly, or rearwardly so as to position the desired subject in frame opening 88.

To facilitate viewing with one eye, a foldable blind means 95 may be carried at one side of housing 83. Blind means 95 may be provided with suitable hinge lines 96, 97, 98 and 99 defining blind areas 100, 101, 102, and 103 which may correspond to selected sidewall areas of the housing 83 so that the blind 95 may be readily folded over the sidewalls of the housing, exit surface 85, and object surface of the magnifier body for protection during storage and nonuse. When the blind means is extended it will be apparent that the eye of the user which is not in the viewing axis 86 will be shielded by the blind.

Figures 15, 16, 17:
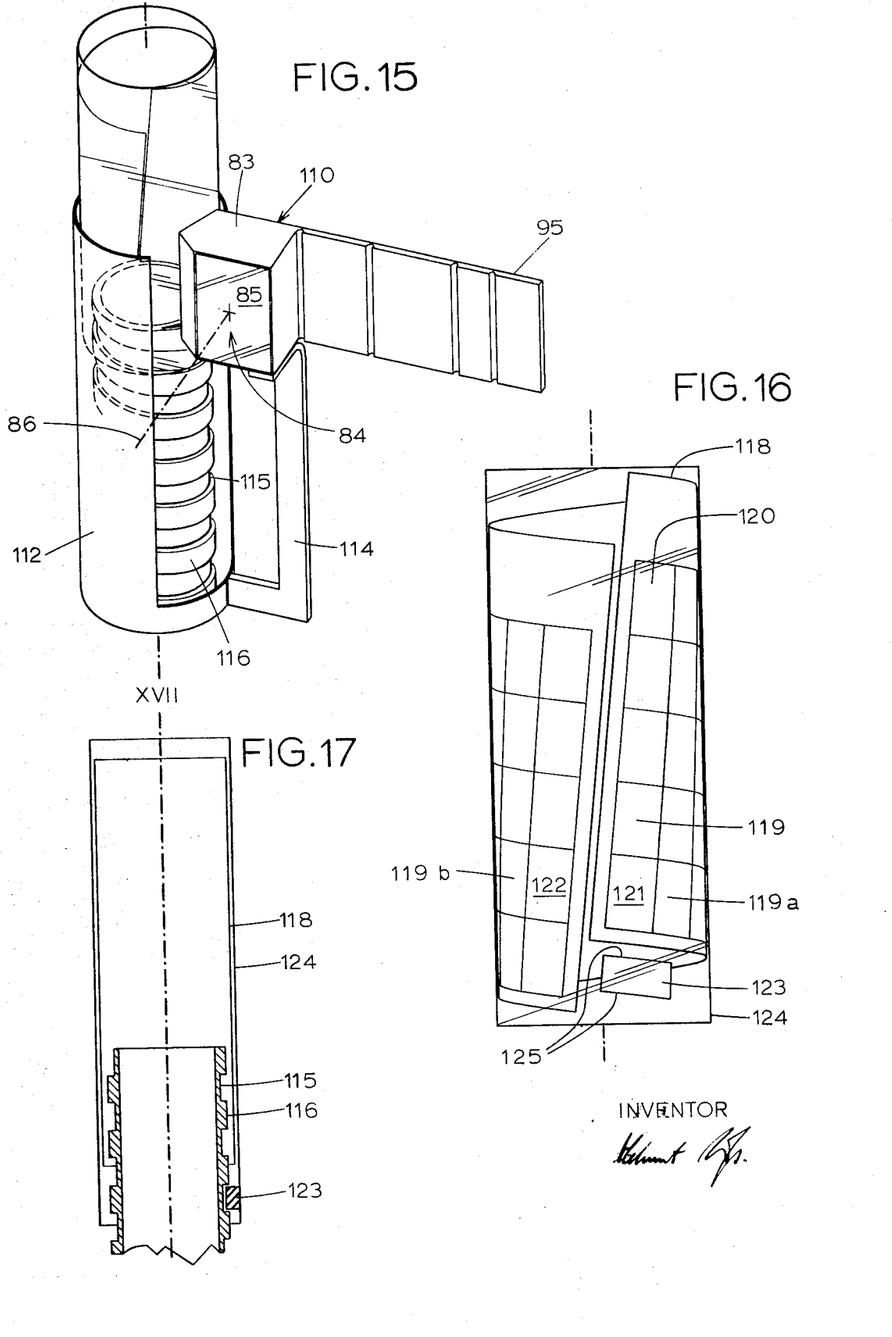
FIG. 15 is a perspective view of a viewing device embodying the optical system of FIG. 2 and illustrating a device for viewing microfilm or microfiche.
FIG. 16 is a plan view of a microfiche card rolled into a cylinder configuration for use in the device shown in FIG. 15.
FIG. 17 is a sectional view taken in the plane indicated by line XVII—XVII of FIG. 15.

In FIGS. 15–17, another device generally indicated at 110 embodying the optical magnifying system of this invention is shown and includes a similar housing 83, magnifier body 84, exit surface 85, viewing axis 86, and blind 95.

In this embodiment of the invention the transport means for the subject to be viewed is differently arranged than that shown in FIG. 14. In FIG. 15 a vertically disposed cylindrical housing 112 may be supported in operative relation to the entrance surface of the magnifier body 84 by a connecting member 114 secured to the bottom of housing 83 at one end and to the lower end of the cylindrical housing 112 at the other end. Cylindrical housing 112 includes therewithin a core member 115 having an external surface provided with a helical thread 116 having a pitch corresponding to the pitch determined by arranging rows of microfiche frames in a helical fashion as shown in FIG. 16.

In FIG. 16 a microfiche sheet 118 is normally provided with a plurality of prints arranged in horizontal courses 119 and vertical rows 120. By twisting one end of the sheet relative to the opposite end and forming a cylinder, a bottom course 119a may be positioned with an end print 121 opposite an end print 122 of a second course 119b thereabove. Thus, each course is arranged for consecutive viewing of all prints on the sheet as the cylindrical sheet is rotated on the screw thread 116.

Means for guiding the sheet during such rotation includes a guide lug 123 provided on the inner surface of a carrier member 124 for sheet 118. Guide lug 123 has top and bottom edges 125 arranged at the same pitch as thread 116 and slidably engageable with side faces of the thread. Carrier member 124 may comprise a transparent jacket which moves with the microfiche sheet 118 or may comprise a cylinder having a window for exposure of a microfiche frame as the sheet is turned within the cylinder.

Device 110 may be held by housing 112 as by the left hand and the cylindrical microfiche sheet 118 turned about the axis of the thread 116 so that the prints on the microfiche will be consecutively placed opposite the entrance surface of the magnifier body 84 for viewing on the axis 86.

In this embodiment ambient light may be used to illuminate the subject on sheet 118 when the carrier member 124 is transparent. It is contemplated that a light source may be readily positioned within the threaded core member for illuminating the microfiche print at the entrance surface of the magnifier body if desirable or necessary.

It will be readily apparent to those skilled in the art that the basic optical system embodied in a clear refractive optical material provided with the concave mirror surface, light transmitting and reflective surface, and object surface as described above will provide maximum utilization of aperture and will afford viewing space along the viewing axis which will reduce to a minimum and virtually eliminate eye fatigue under normal extended reading periods. It will also be understood that the solid magnifying device shown in FIG. 2 may be readily utilized in various optical systems for viewing small objects, displays generated on the miniature cathode ray tubes, micro-images recorded on photographic film or paper, or other uses where a magnified image of high illumination is desired for viewing without the installation of complex, expensive optical equipment.

It will be understood by those skilled in the art that various changes and modifications may be made in the examples of the invention described above and which come within the spirit of this invention and all such modifications and changes within the scope of the appended claims are embraced thereby.

I claim:

1. In a compact optical system having a viewing axis for viewing a two dimensional object and providing high magnification of a virtual image thereof viewable in a maximum viewing space along the viewing axis, the combination of:

means including a mirror with a concave mirror optical surface having an optical axis coinciding with the viewing axis;

means providing a uniformly light transmitting and reflecting optical surface having one edge adjoining an edge of said concave surface and arranged at an angle of less than 90° with respect to a chord of said concave mirror surface extending to an opposite edge thereof;

an object frame defining an object to be viewed, one edge of the object frame adjoining an edge of said concave mirror surface opposite from said one edge of said light transmitting and reflecting surface, the object frame being poistioned at an angle of greater than 90° to said chord of the concave mirror surface and having an object frame optical axis intersecting said viewing axis with an included angle of less than 90° facing said concave mirror surface;

said adjoining geometric realtionship of the object frame, concave mirror surface and light transmitting and reflecting surface providing a folded geometric relation with the utilized apertures defined on said optical surfaces by the intersections of marginal rays connecting the edges of the object frame with a viewpoint on the viewing axis, said utilized apertures for an outermost viewpoint on the viewing axis adjoining in the manner corresponding to said surfaces in said folded geometric relation thereby maximizing viewing space.

2. In an optical system as stated in claim 1 including a body of clear, light transmitting material having a selected index of refraction greater than one positioned in and filling the space between said object frame, said concave mirror surface, and said light transmitting and reflecting surface.

3. In an optical system as stated in claim 2 wherein said body of clear refractive material is provided with a planar exit surface normal to said viewing axis and passing through the intersection of said light transmitting and reflecting surface with the marginal light rays proximate to the objective frame.

4. In an optical system as stated in claim 2 wherein said mirror member includes a portion of the body of said clear refractive material upon which concave mirror surface is formed and is provided by a reflective coating on said material.

5. An optical system as stated in claim 2 wherein said body of clear refractive material includes two body portions joined at a planar interface to provide said light transmitting and reflecting surface.

6. In an optical system as stated in claim 2 including means for imparting curvature to said object frame for regulating the configuration of the magnified image.

7. In an optical system as stated in claim 6 wherein said curvature imparting means includes an entrance surface of concave configuration on said body.

8. An optical system as stated in claim 2 wherein said body includes a planar entrance surface for said object frame.

9. In an optical system as stated in claim 2 wherein said body includes means for neutralizing negative astigmatism in said optical system, said neutralizing means including an exit surface on said body of concave configuration.

10. In an optical system as stated in claim 2 including means for illuminating the object frame.

11. In an optical system as stated in claim 10 wherein said illuminating means includes a light diffusing element and a prism between said diffusing element and said object frame.

12. In an apparatus for viewing and magnifying a two dimensional object the combination of:

a housing having side walls; means at one wall, for holding and positioning a plurality of subjects to be viewed, said positioning means being connected with said housing;

means defining an object frame opening on one wall of said housing and at which one of the subjects to be viewed is positioned;

means defining an exit opening at another wall of said housing and through which said subject may be viewed in a viewing space extending from said exit opening means;

an optical magnifier body of refractive material carried within said housing and having an entrance surface defined by said object frame opening and having an exit surface at said exit opening means, said magnifier body including a concave mirror surface having one edge adjoining said entrance surface defined by said frame opening, a semi-transparent surface in said body between said body exit surface and said concave mirror surface, the edge of said concave mirror surface opposite to said one edge adjoining said semi-transparent surface;

said adjoining entrance, concave mirror, semi-transparent and exit surfaces being physically related by obtuse and acute angles respectively whereby marginal rays from edges of said entrance surface with respect to a viewpoint on said viewing axis are transmitted through said optical magnifier body at corresponding adjoining aperture areas on said surfaces in non-interfering relation whereby a magnified virtual image of the object is seen in its entirety at a farthest viewpoint along a viewing axis extending from said exit surface for a selected size of object frame opening and magnification;

and means for illuminating the subject to be viewed.

13. In an apparatus as stated in claim 12 including a foldable blind means connected with said housing and adapted to cover and protect said exit surface and said entrance surface when said apparatus is not used.

14. In an apparatus as stated in claim 12 wherein said positioning means includes an elongated U-shaped clip having a light transmitting opening therein opposite said entrance opening in said housing.

15. In an apparatus as stated in claim 12 wherein said positioning and holding means for said plurality of subjects to be viewed includes a member having a helical thread thereon, a cylindrical holder for said plurality of subjects to be viewed, and guide means on said holder cooperable with said helically threaded member for selectively positioning each subject to be viewed before said entrance surface.

16. A binocular viewing apparatus for small images including an objective lens;

means for splitting a beam passing through said objective lens into two separate paths;

and an optical system as stated in claim 1 positioned in each of said paths and arranged for binocular viewing of the subject being viewed.

17. An optical viewing system as stated in claim 1 including a second similar optical system arranged to relay the image formed by said first optical system.

18. In an optical system as stated in claim 2 wherein said concave mirror surface is of aspherical shape having meridional curvature decreasing with increasing distance from the mirror axis.

19. In an optical system as stated in claim 1 wherein said concave mirror surface comprises an optically concave mirror surface having narrow coaxial zones of concentric surface curvature.

20. A binocular viewing apparatus for small images including an objective lens;

means for splitting a beam passing through said objective lens into two separate paths;

and an optical system as stated in claim 2 positioned in each of said paths and arranged for binocular viewing of the subject being viewed.

21. In an optical system as stated in claim 2 wherein said concave mirror surface comprises an optically concave mirror surface having narrow coaxial zones of concentric surface curvature.

22. An optical system providing maximum viewing space of a magnified virtual image for a selected object size and magnification, said optical system comprising:

a solid body of optical refractive material provided with a planar surface area defining an object frame area, a concave surface having one edge thereof adjoining one edge of said object surface, the chord of said concave surface being at an angle of greater than 90° to the plane of said planar object frame area, said concave surface having a mirror coating thereon, a semi-transparent surface having one edge adjoining the edge of said concave surface opposite to that edge at which the object frame area adjoins, said planar semi-transparent surface extending at an angle of less than 90° to said chord and having the opposite edge of said transparent surface in spaced relation to said object area surface, said solid body having a planar exit surface on the side of said body opposite to said concave surface;

said entrance surface, semi-transparent surface, concave surface and exit surface being so geometrically related that the marginal rays of an object at said object area extend to said semi-transparent surface, thence to said concave mirror surface, and thence through said semi-transparent surface and exit surface whereby the apertures utilized by said marginal rays on said surfaces adjoin and are non-interfering whereby a complete magnified virtual image of the object at the object area is viewable in a maximized viewing space located along a viewing axis which coincides with the center normal of the concave mirror surface.

* * * * *